United States Patent
Wang

(10) Patent No.: US 8,964,743 B2
(45) Date of Patent: Feb. 24, 2015

(54) METHODS AND ARRANGEMENTS IN A PACKET SWITCHED NETWORK

(75) Inventor: Jinhui Wang, Shanghai (CN)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 154 days.

(21) Appl. No.: 13/510,391

(22) PCT Filed: Dec. 18, 2009

(86) PCT No.: PCT/CN2009/001495
§ 371 (c)(1),
(2), (4) Date: May 17, 2012

(87) PCT Pub. No.: WO2011/072428
PCT Pub. Date: Jun. 23, 2011

(65) Prior Publication Data
US 2012/0230333 A1    Sep. 13, 2012

(51) Int. Cl.
*H04L 12/28* (2006.01)
*H04L 12/18* (2006.01)
*H04L 29/12* (2006.01)
*H04L 29/06* (2006.01)

(52) U.S. Cl.
CPC .......... *H04L 12/18* (2013.01); *H04L 29/12292* (2013.01); *H04L 29/12915* (2013.01); *H04L 61/2069* (2013.01); *H04L 61/6059* (2013.01); *H04L 65/4076* (2013.01); *H04L 65/4084* (2013.01)
USPC ........................................................ 370/390

(58) Field of Classification Search
CPC ............................................... H04L 29/12292
USPC .......................................................... 370/390
See application file for complete search history.

(56) References Cited

U.S. PATENT DOCUMENTS

| 6,055,364 | A  |   | 4/2000 | Speakman et al. |
| 7,526,493 | B2 | * | 4/2009 | Betts et al. ............................ 1/1 |
| 2003/0012190 | A1 | * | 1/2003 | Kaku et al. .................... 370/389 |
| 2004/0027996 | A1 |   | 2/2004 | Birdwell et al. |
| 2004/0076155 | A1 | * | 4/2004 | Yajnik et al. .................. 370/389 |
| 2004/0083306 | A1 | * | 4/2004 | Gloe ............................. 709/245 |

(Continued)

FOREIGN PATENT DOCUMENTS

| CN | 1812375 A | 8/2006 |
| CN | 101247249 A | 8/2008 |

(Continued)

OTHER PUBLICATIONS

Communication with Supplementary European Search Report, EPO Application No. 09852166.9, Apr. 16, 2013.

(Continued)

*Primary Examiner* — Nicholas Jensen
*Assistant Examiner* — Syed S Ali
(74) *Attorney, Agent, or Firm* — Myers Bigel Sibley & Sajovec, PA

(57) ABSTRACT

The present invention concerns content searches in a distributed environment such as in an IPv6 network. This is achieved by deriving a multicast address from a string associated with the content to be searched. The searching party and the server owning the content use a common function for deriving this multicast address. The content owner listens to this multicast address and the searching party sends requests for the content on that multicast address.

17 Claims, 6 Drawing Sheets

(56) References Cited

U.S. PATENT DOCUMENTS

| | | |
|---|---|---|
| 2005/0021617 A1 | 1/2005 | Rusitschka |
| 2005/0021843 A1 | 1/2005 | Duigenan et al. |
| 2005/0157720 A1* | 7/2005 | Chandhok et al. ............ 370/390 |
| 2006/0176879 A1* | 8/2006 | Fleury et al. ................. 370/390 |
| 2008/0198847 A1 | 8/2008 | Yamagishi et al. |
| 2008/0243836 A1* | 10/2008 | Miyoshi ............................ 707/5 |
| 2010/0064324 A1* | 3/2010 | Jenkin et al. .................... 725/59 |
| 2012/0307826 A1* | 12/2012 | Matsuoka ..................... 370/390 |
| 2013/0148660 A1* | 6/2013 | Ashwood-Smith et al. .. 370/390 |
| 2013/0242995 A1* | 9/2013 | Onoue .......................... 370/390 |
| 2013/0315240 A1* | 11/2013 | Kobayashi .................... 370/390 |
| 2013/0336319 A1* | 12/2013 | Liu et al. ...................... 370/390 |

FOREIGN PATENT DOCUMENTS

| | | |
|---|---|---|
| EP | 1 679 856 A1 | 7/2006 |
| WO | WO 2009/121393 A1 | 10/2009 |

OTHER PUBLICATIONS

International Search Report and Written Opinion of the International Searching Authority, International Application No. PCT/CN2009/001495, Sep. 23, 2010.

International Preliminary Report on Patentability, International Application No. PCT/CN2009/001495, Apr. 5, 2012.

Chinese Office Action Corresponding to Chinese Patent Application No. 200980163009.1; Date Mailed: May 26, 2014; English Translation Thereof, 12 Pages.

* cited by examiner

METHODS AND ARRANGEMENTS IN A PACKET SWITCHED NETWORK

CROSS REFERENCE TO RELATED APPLICATION

This application is a 35 U.S.C. §371 national stage application of PCT International Application No. PCT/CN2009/001495, filed on 18 Dec. 2009, the disclosure and content of which is incorporated by reference herein in its entirety. The above-referenced PCT International Application was published in the English language as International Publication No. WO 2011/072428 A1 on 23 Jun. 2011.

TECHNICAL FIELD

The present invention relates to methods and arrangements in a packet switched network supporting multicast such as an IPv6 network, and in particular to a solution for achieving a content searchable network.

BACKGROUND

An Internet Protocol (IP) network is a distributed environment comprising a plurality of servers and routers. Some of the servers may be content servers storing content to be shared between other servers and users.

When searching for a specific content, a problem is to find a server that provides that specific content.

Existing mechanisms for searching for a content are index servers, flooding and various complex algorithms.

In an index server, the content owners publish the information of the resource to the index server. When someone wants to search for a content, he sends a request to the index server and the index server responds to the request. This is an efficient solution but if the index server fails, the entire search mechanism fails.

In flooding, each server records the IP addresses of it's neighbours. When a server wants to search for something, it sends the requests to all neighbouring servers. Then the neighbouring servers forward the request to the neighbours of the neighbouring servers. This is obviously not an efficient solution since it occupies a lot of bandwidth but the solution is not dependent on one single point as the index server.

Complex Algorithms such as Chord, Pseudo-DHT can be used to optimize the behaviour of the flooding. The algorithms make it possible to send the requests to only a subset of the neighbours.

SUMMARY

A problem is thus to achieve a solution for content searches in a distributed environment such as in an IP network.

According to a first aspect of the present invention a method in a server for publishing a content in a network supporting multicast is provided. The method comprises storing a content in a memory, associating the content with at least one string by a first associator. For each of the at least one string, the string is associated with a multicast address by a second associator, and the server listens to said multicast address by an input to be able to receive request for the stored content on said multicast address.

According to a second aspect of the present invention, a method in a network supporting multicast for searching for a content in the network is provided. In a first step a string to be used for searching for said content is received by an input. I.e. a user may enter a string manually via input means. The string is associated with a multicast address by an associator. In a subsequent step a request for said content is sent to said multicast address. The request may contain authentication information in addition to the information directly related to the content request.

According to a third aspect of the present invention a server for publishing a content in a network supporting multicast is provided. The server comprises a memory for storing a content and a first associator for associating the content with at least one string. Moreover a second associator for associating the string with a multicast address is provided, and an input for listening to said multicast address to be able to receive request for the stored content on said multicast address.

According to a fourth aspect of the present invention, a node adapted for searching for a content in a network supporting multicast is provided. The node comprises an input for receiving a string to be used for searching for said content. This string may be received via input means from an end-user, e.g. via a end-user terminal. Further, an associator for associating the string with a multicast address, and an output for sending a request for said content to said multicast address are provided.

An advantage with embodiments of the present invention is that the solution is robust against failures.

A further advantage is that the solution is efficient and simple.

DETAILED DESCRIPTION

Figure 1:
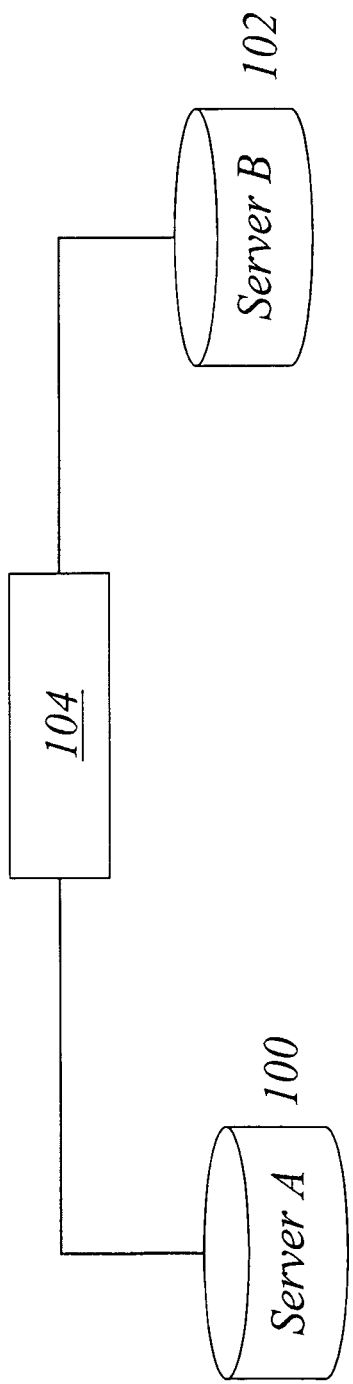
FIG. 1 illustrates a typical topology wherein the present invention may be implemented.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

In order to enable efficient content searches in a distributed environment such as in an IPv6 network, the idea is to make use of multicast. An example of a distributed environment wherein the present invention may be implemented is an IPv6 network which is currently supporting multicast, but the invention can be used in all networks supporting multicast. The distributed environment typically comprises a plurality of servers and routers wherein some of the servers are content servers. Each content can be associated with one or more strings. The invention concerns the case when a server or another entity wants to search for a content by using a string and the searcher will then find all servers having content associated with the used string. An example of content is an episode of a TV show, wherein the string is a name of one actor participating in the TV show.

Hence, a server stores a content and at least one string is associated with the content. It should be noted that although a one-to-one mapping between the content and the strings may be preferred, a plurality of strings may be used for one content. Each string describes the content in some aspect and each string is associated with a multicast address according to the present invention. The association with the multicast address can be performed by e.g. applying a function to the string resulting in a number series, e.g. a hexadecimal number series or another series. The series may then be converted into the multicast address. The content owner listens to the multicast address where it can receive requests for the content that it stores. Hence when a server searches for a content by using the above described string, the searching server will associate the string to the same multicast address as the content server and send the request to that multicast address to which the content owner listens. Therefore, it is possible to find the content by only one request if it exists. The multicast address may be a link local multicast address, which is further described in RFC 2373.

FIG. 1 illustrates a typical topology wherein the embodiments of the present invention may be implemented. In order to enable multicast in a network, a switch or a router 104 that supports multicast is connected to the servers. Further, servers 100, 102 that own the content must have a connection to the network, e.g. an IPv6 network. Further, the network wherein the present invention is implemented should have authority to assign multicast addresses, but that is not a requirement.

Figure 2:
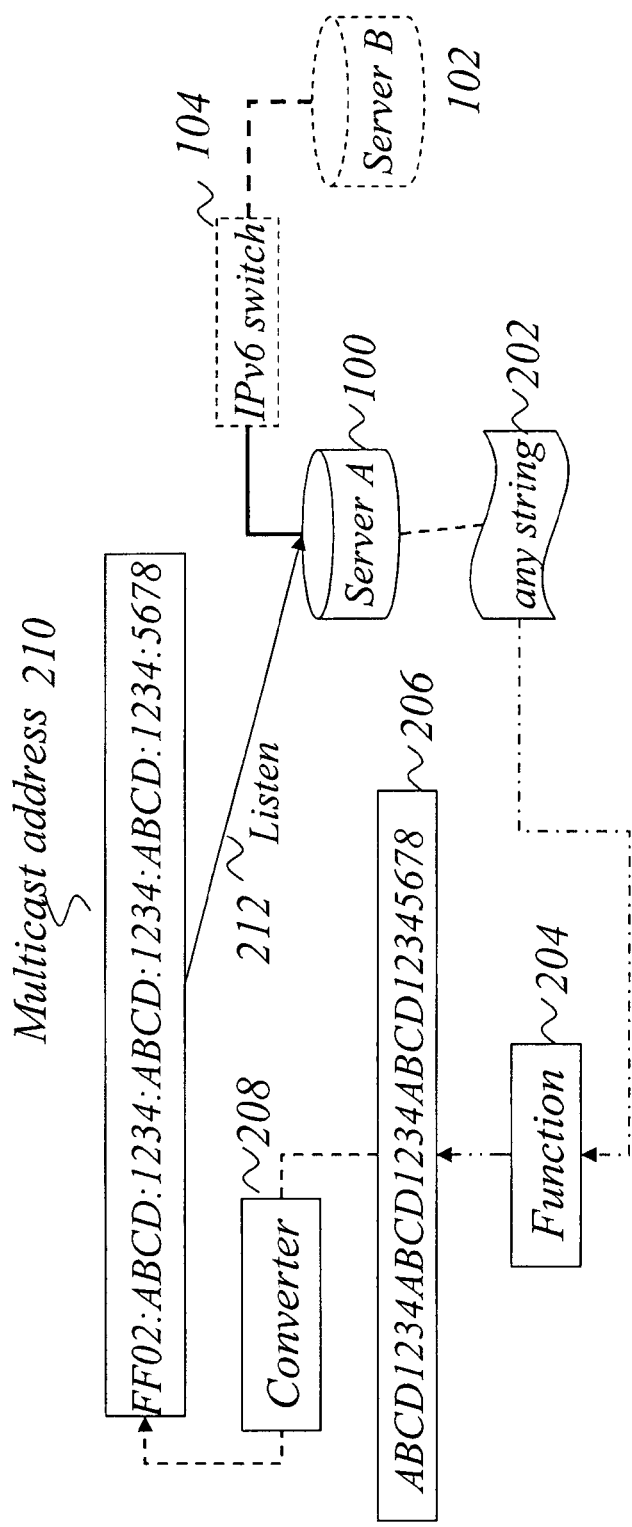
FIG. 2 illustrates a content owner according to an embodiment of the present invention.
Figure 3:
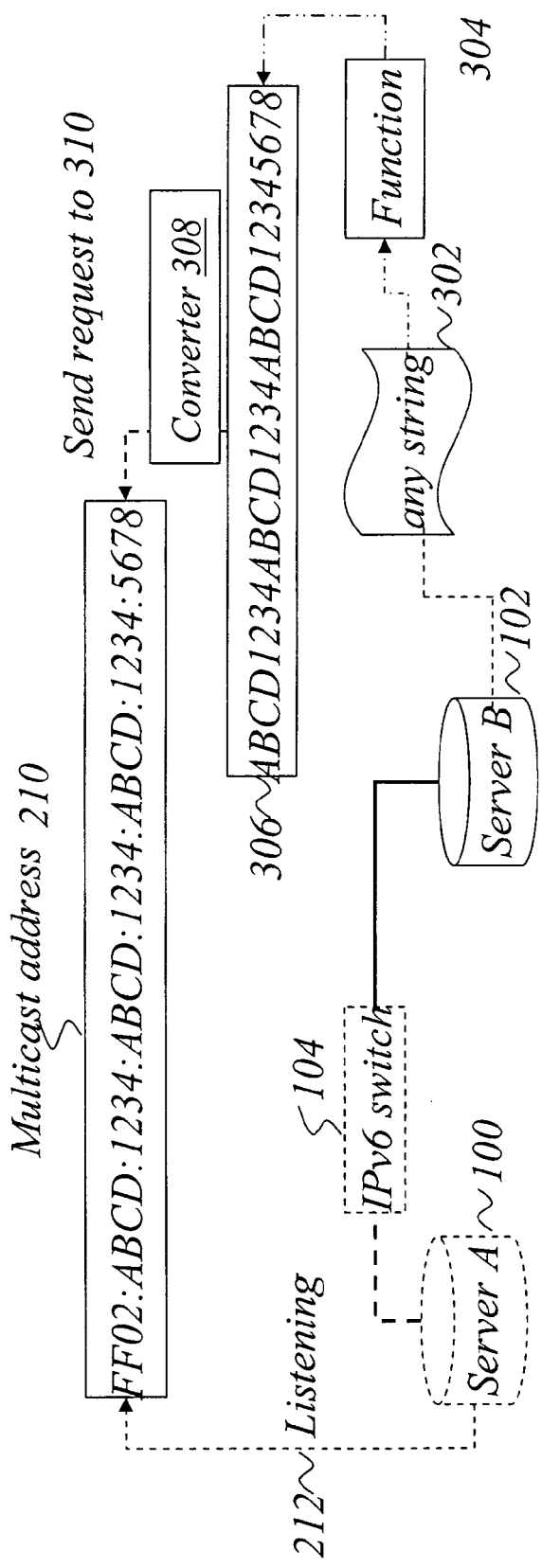
FIG. 3 illustrates a searcher according to an embodiment of the present invention.

An embodiment of the present invention will now be described in conjunction with FIGS. 2 and 3. FIGS. 2 and 3 illustrate the scenario where a server A 100 owns a content, content A, wherein the content A is associated with the string 202 "any string", and "any string" describes the content A in at least one aspect. An example of the content may be a music video and the string may be the name of the artist of the music video. Another example is that the content A is a book and a first string associated with the book is the author of the book and a second string associated with the book is the title of the book. In this example, the server will listen to two multicast addresses, one for each string. Another server, server B 102 searches for the content A and is hence searching for the server 100 owning the content A.

As illustrated in FIG. 2, the server A 100 stores a content which is associated with "any string" 202 and the server A 100 calls a function 204, which is a hash function in this example, to generate a series 206, exemplified by the hexadecimal number series "ABCD1234ABCD1234ABCD12345678". Then this series 206 is converted by a converter 208 into a multicast address 210 e.g. a link local multicast address e.g., FF02:ABCD:1234:ABCD:1234:ABCD:1234:5678 by a converter 208. By listening to the multicast address FF02: ABCD:1234:ABCD:1234:ABCD:1234:5678 the server A can receive requests for content associated with the keyword "any string". In other words, the server A publishes the information, "I own a content associated to the string "any string"", to the distributed environments by listening 212 to this multicast address.

Turning now to FIG. 3 illustrating a server 102 (which may be any entity comprising multicast functionalities), server B, searching for a content by using the string "any string". The server B 102 applies the same function 304 as server A 100 to the string 302 "any string". This function 304 must be globally known in the distributed environment. Since the same function 304 is applied on the same string, the same series 306 will be obtained. This series 306 is converted in the same way in server B 102 as in server A 100 and will therefore obtain the same multicast address 210. To search for a content associated with string 302 "any string", server B 102 sends one request to the obtained multicast address 210. All servers listening to the multicast address (i.e. joining that multicast group) will receive the request for the content. And, all servers joining that multicast address has a content associated with the string "any string". Although all servers may not contain identical contents.

When the content owner receives the request on the multicast address it replies to the searching server.

The searching server may receive more than one reply. In that case a mechanism is needed to select between the replies and select one of the found contents. However such a mechanism is not within the scope of the present invention.

Figure 5:
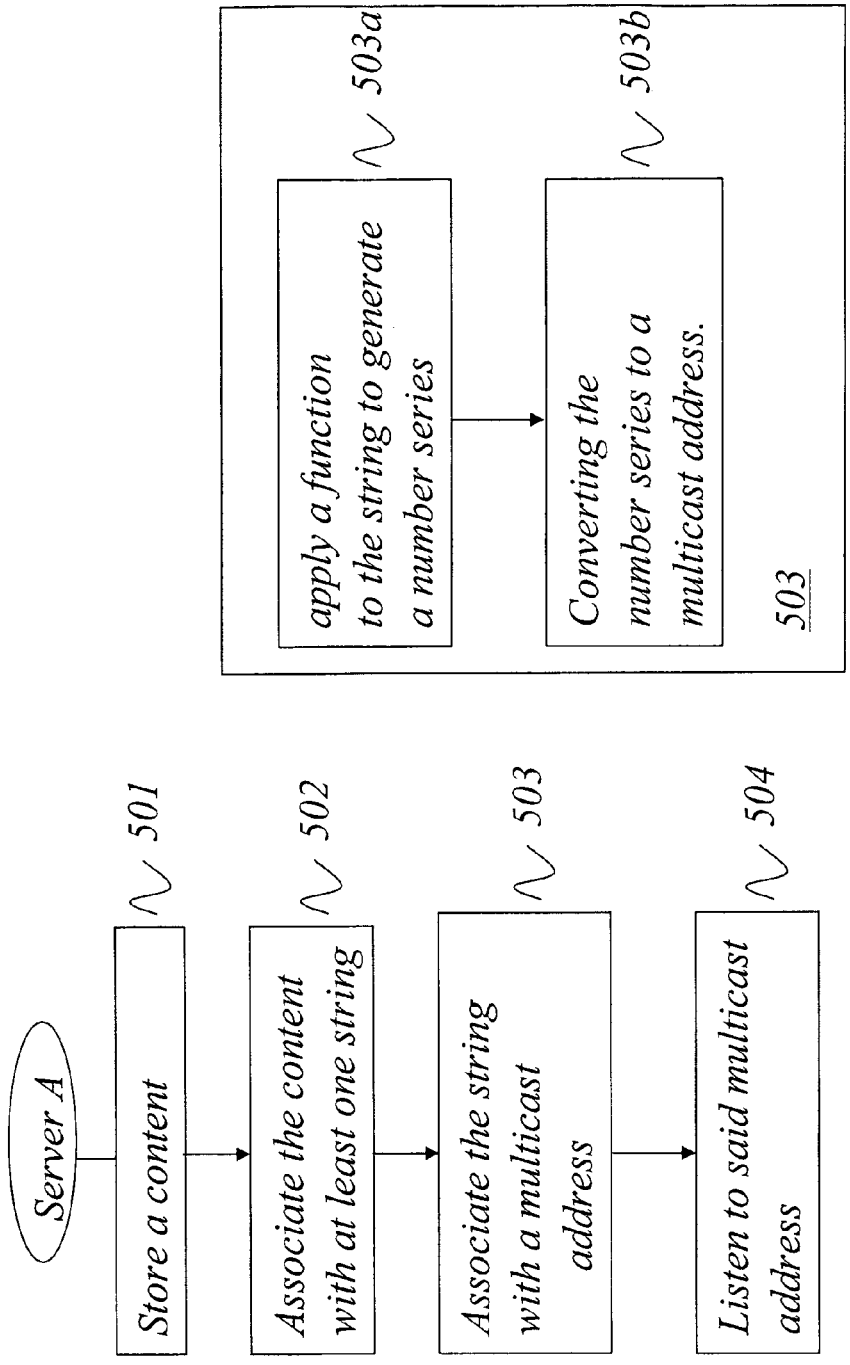
FIGS. 5 and 6 are flowcharts of the methods according to embodiments of the present invention.

Hence, a method in a server for publishing a content in a network supporting multicast is provided as illustrated in the flowchart of FIG. 5. The method comprises storing 501 a content in a memory, associating 502 the content with at least one string by a first associator. For each of the at least one string, the string is associated 503 with a multicast address by a second associator, and the server listens 504 to said multicast address by an input to be able to receive request for the stored content on said multicast address.

Further, the step of associating the string with a multicast address may comprise applying 503a a function to the string to generate a series, and converting 503b the series to the multicast address.

Figure 6:
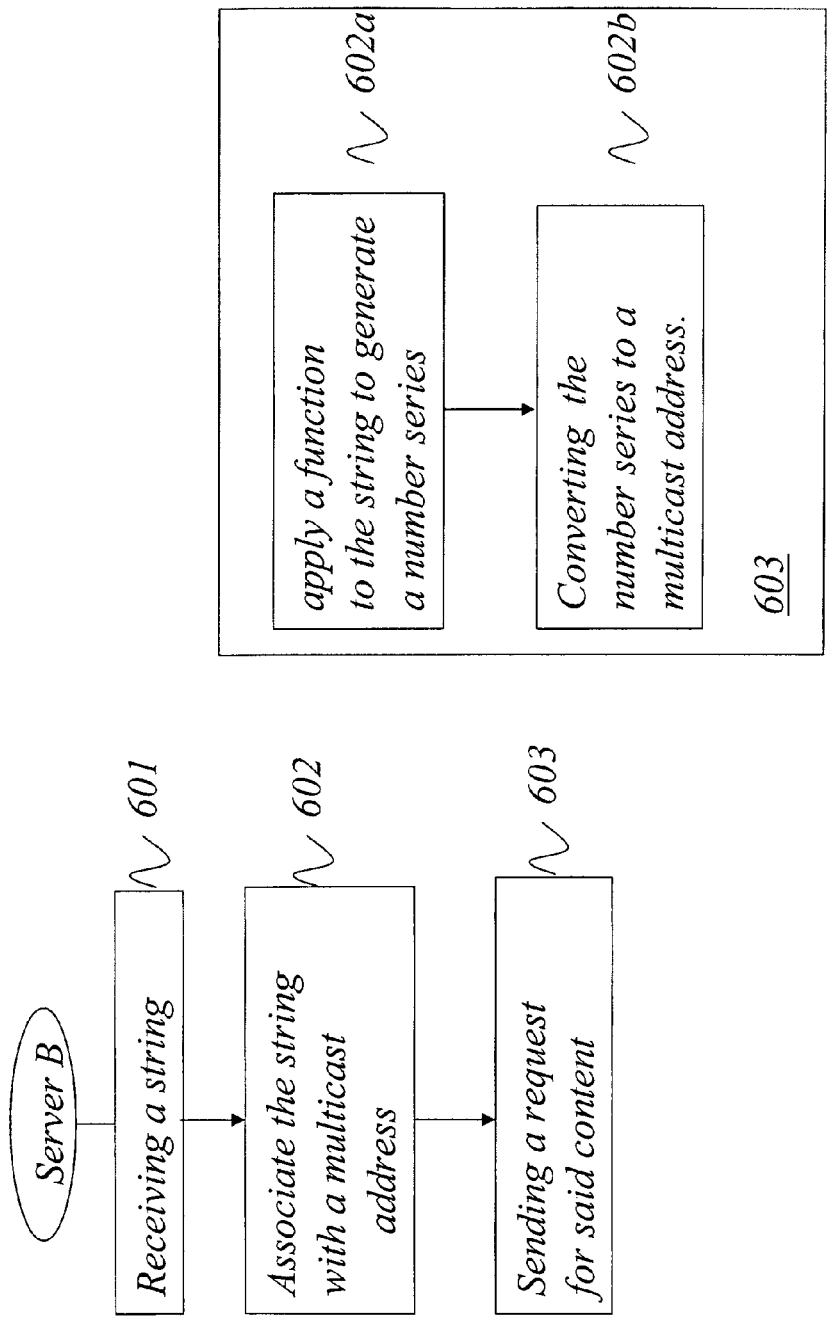

Moreover, a method for searching for a content in an IP network is illustrated in the flowchart of FIG. 6. In a first step 601 a string to be used for searching for said content is received by an input. I.e. a user may enter a string manually via input means. The string is associated with a multicast address by an associator in step 602. In a subsequent step 603 a request for said content is sent to said multicast address. The request may contain authentication information in addition to the information directly related to the content request.

According to one embodiment, the step of associating the string with a multicast address comprises applying 602a a function to the string to generate a series, and converting 602b the series to the multicast address.

An IPv6 multicast address is an identifier for a group of nodes. A node (e.g. a server) may belong to any number of multicast groups. In RFC 2373, the multicast group identity comprises 112 bits. So, theoretically, $2^{112}=5.19e+33$ multicast groups may be used. However, the total number of multicast groups does not have to limit the possible number of strings. If the number of strings is more than 5.19ê+33 (i.e. the number of possible multicast groups), a function may be used to map a plurality of strings to one single multicast address and hence enabling more possible strings than 5.19ê+33. As a further alternative, it is also possible to utilize the port numbers of the IP addresses as well, which also expands the number of possible strings as each IP address has 65535 port numbers. The function to be applied on the string must be globally known in the distributed environment. Each server that wants to be a part of the method according to the embodiments of the present invention must be aware of this function. The function is exemplified by a hash function but other functions which are able to map the strings to e.g. a number space evenly. For example, if there are $2^{112}$=5.19e+33 different strings, it is desired that that the function should map each of the strings to one dedicated multicast address.

If the servers are located in different links, i.e. the servers can not access each other directly and a router or a L3 switch has to be used, it is possible to use site local or organizational local or global scope multicast groups (multicast IP routing), which have the format of FF05:x:x:x:x:x:x:x, FF08:x:x:x:x:x:x:x and FF0E:x:x:x:x:x:x:x. The content owner should listen to IP addresses starting with FF02, FF05 or FF0E and the searching party should send requests to these groups as well. That means that the IPv6 multicast routing support may be needed to forward the requests across IPv6 routers or switches. All of these network devices should in this case be IPv6 multicast routing enabled.

Figure 4:
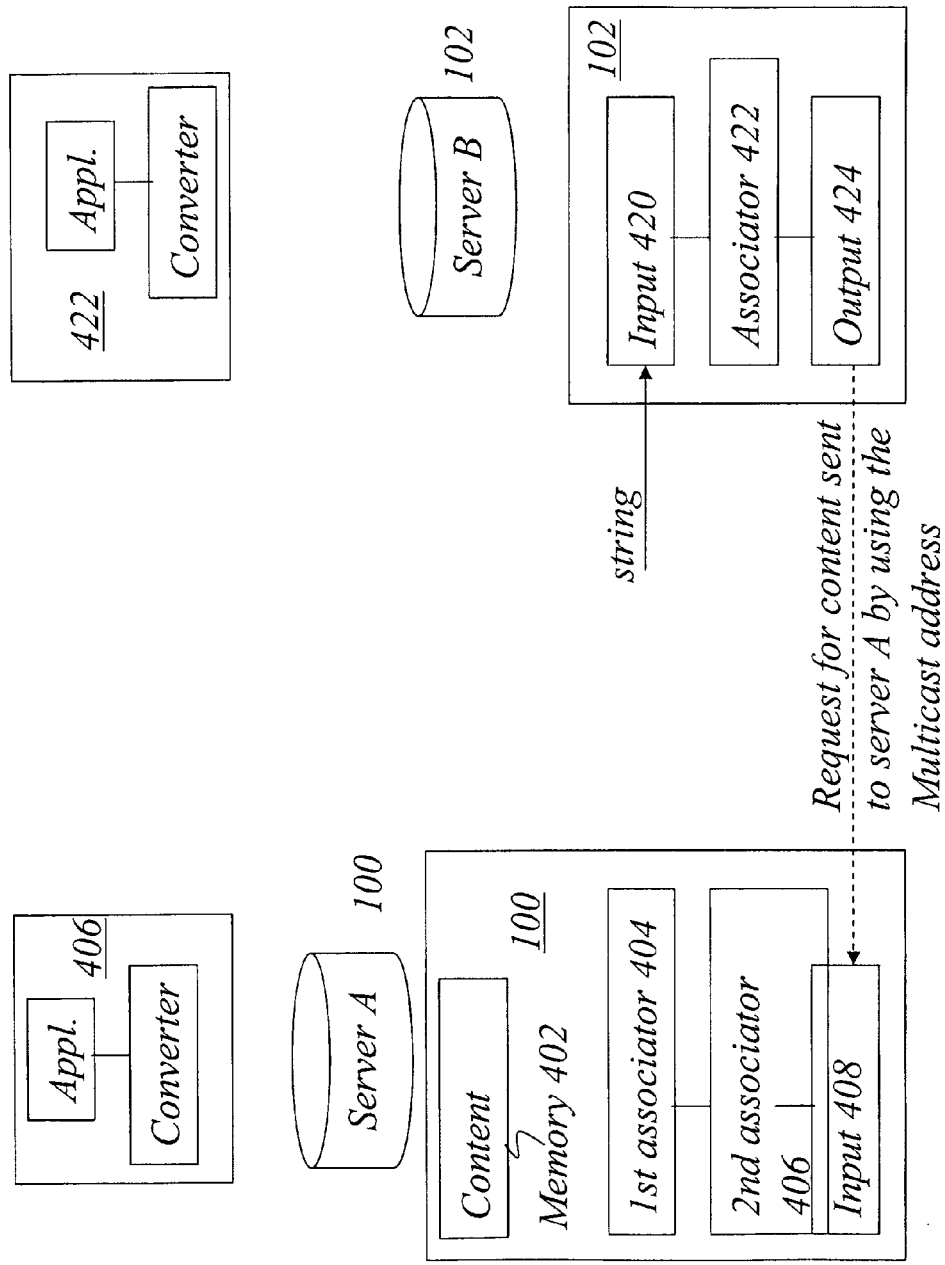
FIG. 4 illustrates the content server and the searcher server according to embodiments of the present invention.

Turning now to FIG. 4 showing a server 100 for publishing a content in an IP network. The server 100 comprises a memory 402 for storing a content and a first associator 404 for associating the content with at least one string. Moreover a second associator 406 for associating the string with a multicast address is provided, and an input 408 for listening to said multicast address to be able to receive request for the stored content on said multicast address.

The second associator 406 may further comprise an applicator for applying a function such as a hash function to the string to generate a series, and a converter for converting the series to the multicast address.

A node 102 such as a server or end-user terminal adapted for searching for a content in an IP network is also illustrated in FIG. 4. The node 102 comprises an input 420 for receiving a string to be used for searching for said content. This string may be received via input means from an end-user, e.g. via a end-user terminal. Further, an associator 422 for associating the string with a multicast address, and an output 424 for sending a request for said content to said multicast address are provided.

Also this associator 422 may comprise an applicator for applying a function to the string to generate a series, and a converter for converting the series to the multicast address.

It should also be noted that in small networks, it is possible to broadcast the request for a content, which implies that all content owners will receive all requests. This broadcast solution may be used both in networks lacking multicast support and in networks supporting multicast since the broadcast solution may be less costly than multicast in small networks.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a server for publishing a content in a network supporting multicast, the method comprises the steps of:
storing the content;
associating the content with at least one keyword string, said at least one keyword string describing the content in at least one aspect; and for each of the at least one keyword string:
associating the keyword string with a multicast address, wherein the step of associating the keyword string with a multicast address comprises:
applying a hash function to the keyword string to generate a series, and converting the series to the multicast address; and
listening to said multicast address to receive a request for the stored content on said multicast address.

2. The method according to claim 1, wherein the multicast address is a link-local multicast address.

3. The method according to claim 1,
wherein said at least one keyword string describing the content comprises at least one of a name of an actor, a name of an artist, a name of an author, or a title, corresponding to the content, and
wherein associating the content with said at least one keyword string comprises associating the content with said at least one keyword string that comprises the name of the actor, the name of the artist, the name of the author, and/or the title, corresponding to the content.

4. A method in a network supporting multicast for searching for a content in the network, the method comprises the steps of:
receiving, as a user input, at least one string to be used for searching for said content, said at least one string describing the content in at least one aspect;
associating each of said at least one string with a multicast address, wherein the step of associating the string with a multicast address comprises:
applying a hash function to the string to generate a series, and
converting the series to the multicast address; and
sending a request for said content to said multicast address.

5. The method according to claim 4, wherein the multicast address is a link-local multicast address.

6. A server for publishing a content in a network supporting multicast, the server comprises:
a memory configured to store the content;
a first associator configured to associate the content with at least one keyword string in which said at least one keyword string describes the content in at least one aspect;
a second associator configured to associate each of said at least one keyword string with a multicast address, wherein the second associator further comprises:
an applicator configured to apply a hash function to the keyword string to generate a series, and
a converter configured to convert the series to the multicast address; and
an input configured to listen to said multicast address to receive a request for the stored content on said multicast address.

7. The server according to claim 6, wherein the multicast address is a link-local multicast address.

8. A node adapted for searching for a content in a network supporting multicast, the node comprising:
an input configured to receive, as a user input, at least one string to be used for searching for said content in which said at least one string describes the content in at least one aspect;
an associator configured to associate each of said at least one string with a multicast address, wherein the associator further comprises:

an applicator configured to apply a hash function to the string to generate a series; and a converter configured to convert the series to the multicast address; and an output configured to send a request for said content to said multicast address.

9. The node according to claim 8, wherein the node is a server.

10. The node according to claim 8, wherein the node is a mobile terminal.

11. The node according to claim 8, wherein the multicast address is a link-local multicast address.

12. method for a node searching for a content stored in a server in a network supporting multicast, the method comprising:
   associating each of at least one string describing the content in at least one aspect with a multicast address at the node by applying a hash function to the string to generate a series and converting the series to the multicast address, wherein said at least one string is received, as a user input, by the node and used to search for said content;
   sending a request for said content by the node to the multicast address; and
   obtaining said content by the server responding to the request when the server listens to the multicast address, wherein the server has associated the content with said at least one string and associated each of said at least one string with the multicast address, in which the server has associated the content with each of said at least one string by applying said hash function to the string to generate the series and converting the series to the multicast address.

13. The method according to claim 12, wherein the multicast address is a link-local multicast address.

14. The method according to claim 12, wherein the node is a server or a mobile terminal.

15. A node adapted for searching for a content stored in a server in a network supporting multicast, the node includes:
   an input configured to receive, as a user input, at least one string to be used for searching for said content, said at least one string describing the content in at least one aspect;
   an associator configured to associate each of said at least one string with a multicast address by applying a hash function to the string to generate a series and converting the series to the multicast address; and
   an output configured to output a request for said content to the multicast address,
   wherein the node obtains the content by the server responding to the request when the server listens to the multicast address, wherein the server has associated the content with said at least one string and associated each of said at least one string with the multicast address, in which the server has associated the content with said at least one string by applying said hash function to the string to generate the series and converting the series to the multicast address.

16. The node according to claim 15, wherein the multicast address is a link-local multicast address.

17. The node according to claim 15, wherein the node is a server or a mobile terminal.

* * * * *